US009898657B2

(12) United States Patent
Cui et al.

(10) Patent No.: US 9,898,657 B2
(45) Date of Patent: Feb. 20, 2018

(54) FOUR-DIMENSIONAL CODE, IMAGE IDENTIFICATION SYSTEM AND IMAGE IDENTIFICATION METHOD BASED ON THE FOUR-DIMENSIONAL CODE, AND RETRIEVAL SYSTEM AND RETRIEVAL METHOD

(71) Applicants: Ming Cui, Guangdong (CN); Wensheng Tian, Guangdong (CN)

(72) Inventors: Ming Cui, Guangdong (CN); Wensheng Tian, Guangdong (CN)

( * ) Notice: Subject to any disclaimer, the term of this patent is extended or adjusted under 35 U.S.C. 154(b) by 0 days.

(21) Appl. No.: 14/903,557

(22) PCT Filed: Nov. 5, 2014

(86) PCT No.: PCT/CN2014/090389
§ 371 (c)(1),
(2) Date: Jan. 7, 2016

(87) PCT Pub. No.: WO2016/065661
PCT Pub. Date: May 6, 2016

(65) Prior Publication Data
US 2016/0328611 A1    Nov. 10, 2016

(30) Foreign Application Priority Data
Oct. 30, 2014  (CN) .......................... 2014 1 0604175

(51) Int. Cl.
*G06K 9/00* (2006.01)
*G06K 19/06* (2006.01)
(Continued)

(52) U.S. Cl.
CPC ..... *G06K 9/00577* (2013.01); *G06K 9/00671* (2013.01); *G06K 9/2063* (2013.01);
(Continued)

(58) Field of Classification Search
CPC .... G06K 1/121; G06K 1/123; G06K 7/10861; G06K 7/10871; G06K 7/1404–7/1408;
(Continued)

(56) References Cited

U.S. PATENT DOCUMENTS 8,447,122 B2 * 5/2013 Cheong ................... G06T 1/005
                                                        382/232
8,534,567 B2 * 9/2013 Kiliccote ............. G06K 7/1443
                                                        235/462.01
(Continued)

*Primary Examiner* — Jose Couso
(74) *Attorney, Agent, or Firm* — Locke Lord LLP; Tim Tingkang Xia, Esq.

(57) ABSTRACT

The invention discloses a four-dimensional code, an image identification system and an image identification method based on the four-dimensional code, a retrieval system and a retrieval method. All the conceives of the invention are mainly based on the four-dimensional code which includes an identification image and a group of recognition data corresponding to the identification image, wherein the identification image includes a true color image, a two-dimensional code, a color overlaid on the two-dimensional code, and an ID No., and the true color image, the two-dimensional code, the color overlaid on the two-dimensional code and the ID No. have same or corresponding indexes. Data corresponding to the four-dimensional code is stored through a server, and the four-dimensional code or the identification image is scanned during identification or retrieval, so that corresponding data can be retrieved through image identification processing, and returned to a mobile terminal. The invention has high identification precision and broad application range, and can be applied to various commercial purposes.

12 Claims, 6 Drawing Sheets

(51) Int. Cl.
*G06K 9/20* (2006.01)
*G06K 9/32* (2006.01)

(52) U.S. Cl.
CPC ..... *G06K 9/3216* (2013.01); *G06K 19/06037* (2013.01); *G06K 2009/0059* (2013.01); *G06K 2009/3225* (2013.01)

(58) Field of Classification Search
CPC .......... G06K 9/00234; G06K 9/00577; G06K 9/00671; G06K 9/2063; G06K 9/3216; G06K 9/4642; G06K 9/4652; G06K 9/4661; G06K 9/52; G06K 9/6212; G06K 15/027; G06K 15/129; G06K 15/1802; G06K 17/0016; G06K 17/0025; G06K 19/06–19/06178; G06K 2009/00328; G06K 2009/0059; G06K 2009/3225; G06K 2019/06225; G06K 2209/27; G06K 2215/0094; G06K 5/02; G06K 7/1421; G06K 7/1426; G06K 7/143; G06K 7/1434; G06K 7/1439; G06T 3/4015; G06T 7/0042; G06T 7/0079; G06T 7/0081; G06T 7/40; G06T 7/401; G06T 7/408; G06T 11/001; G06T 11/40; G06T 19/20; G06T 2201/0201; G06T 2207/10024; G06T 2207/20021; G06T 2207/20052; G06T 2219/2012; G06F 11/1435; G06F 11/3086; G06F 17/30; G06F 17/301; G06F 17/3025; G06F 17/30525; G06F 17/30722; G06F 17/30802; G06F 17/30997; G06F 2211/104; G06F 2212/466; G06F 2212/7207; H04N 1/46; H04N 1/60–1/6055; H04N 1/644; H04N 13/0257; H04N 13/0037; H04N 13/0422; H04N 13/0062; H04N 13/0066; H04N 21/4312; H04N 21/4353; H04N 2013/0077; H04N 2201/3228; H04N 2201/3229; H04N 2201/3256; H04N 9/8233; G06Q 30/018
See application file for complete search history.

(56) References Cited

U.S. PATENT DOCUMENTS

| | | | |
|---|---|---|---|
| 8,948,445 B2* | 2/2015 | Mow | G06K 7/1434 382/100 |
| 9,311,654 B1* | 4/2016 | Ellis | G06Q 30/0255 |
| 9,576,195 B2* | 2/2017 | Na | G06F 17/30047 |
| 9,659,201 B2* | 5/2017 | Yoshida | G06K 19/06037 |
| 9,697,447 B2* | 7/2017 | Schory | G06K 19/06037 |
| 9,723,253 B2* | 8/2017 | Tsujimoto | H04N 5/772 |
| 9,760,820 B2* | 9/2017 | Lin | G06K 19/06037 |
| 9,773,168 B2* | 9/2017 | Chatow | G06K 9/00577 |
| 2012/0217304 A1 | 8/2012 | Atkinson | G06K 19/06018 235/488 |
| 2013/0087612 A1* | 4/2013 | Locher | G06Q 20/32 235/380 |
| 2013/0112760 A1* | 5/2013 | Schory | G06K 19/06037 235/494 |
| 2014/0119647 A1* | 5/2014 | Cheong | G06T 9/00 382/166 |
| 2015/0108220 A1* | 4/2015 | Gu | G06K 19/06037 235/462.11 |
| 2015/0317642 A1* | 11/2015 | Argue | G06Q 30/018 705/317 |
| 2015/0324946 A1* | 11/2015 | Arce | G06T 1/0021 382/251 |
| 2015/0347889 A1* | 12/2015 | Nosaka | G06Q 30/018 726/7 |
| 2016/0027014 A1* | 1/2016 | Spencer, II | G06Q 20/327 705/44 |
| 2016/0042262 A1* | 2/2016 | Tanaka | G06K 7/1417 235/494 |
| 2016/0062612 A1* | 3/2016 | Chum | G06F 3/04842 715/739 |
| 2016/0112125 A1* | 4/2016 | Yokoi | H04B 10/116 398/118 |
| 2016/0162767 A1* | 6/2016 | Ito | G06K 19/06037 235/494 |
| 2016/0314474 A1* | 10/2016 | Schibi | G06Q 30/018 |
| 2017/0046606 A1* | 2/2017 | Hosokane | G06K 19/06 |
| 2017/0075885 A1* | 3/2017 | Na | G06F 17/30047 |
| 2017/0178146 A1* | 6/2017 | Mayer | G06Q 30/018 |
| 2017/0185880 A1* | 6/2017 | Lin | G06K 19/06037 |
| 2017/0200035 A1* | 7/2017 | Teraura | G06K 7/10742 |
| 2017/0316297 A1* | 11/2017 | Lee | G06K 19/06103 |

* cited by examiner

Mode of processing for a red part:

Mode of processing for a green part:

Mode of processing for a blue part:

FOUR-DIMENSIONAL CODE, IMAGE IDENTIFICATION SYSTEM AND IMAGE IDENTIFICATION METHOD BASED ON THE FOUR-DIMENSIONAL CODE, AND RETRIEVAL SYSTEM AND RETRIEVAL METHOD

TECHNICAL FIELD

The present invention relates to the field of image identification, and in particular, to an image identification system, a four-dimensional code using the system, and a retrieval system and a retrieval method thereof.

BACKGROUND ART

An image identification technology is an important field for current computer studies, and has been developed quickly in recent years. It is widely applied almost in each field, such as handwriting input, zip code identification, Chinese character identification, human face identification, fingerprint identification, iris identification, and has been quite mature. These technologies have been widely applied in daily life of people, and have a significant impact on economy, military affairs, state security and the daily life of people.

Current image identification technologies are only applied in some specific fields, while these applications cannot be followed in real time, and wide application of these technologies in common fields are not sufficient, for example, a big database is not established, and a general image identification standard is lacked. To be specific, image identification to voice playing of books for child education cannot be achieved since no corresponding image identification standards are defined and it is not supported by a server database. Such knowledge like geometry, physics and chemistry in middle school cannot be searched since the figure structures or special character affairs thereof cannot be searched in network, so that only short message No. identification can be conducted while paying via a smartphone, which will cause loss of malicious withdrawal once the smartphone is lost, and palmprint identification cannot be implemented (while it is very convenient to use the smartphone to shoot the palmprint), and all these need to define corresponding image identification standards and support of the server database, and need to apply system support of software and network.

SUMMARY OF THE INVENTION

The object of the present invention is to provide an image identification system so as to solve the foregoing problems of the prior art, including:

an identification image and a group of recognition data corresponding to the identification image, the identification image including at least three formats: a full format including a true color image, a two-dimensional code, a color overlaid on the two-dimensional code, an ID No., and a plurality of calibration points; a half format including a true color image the four corners of which are respectively provided with a calibration point; and a pure image format only including a true color image; and a server including a receiving and sending module, an identification data generation module, a database for storing identification data, and a retrieval judgment module;

wherein the identification image may be captured through a mobile terminal and sent to the server through a network, the server receives the identification image, parses corresponding recognition data, and compares the corresponding recognition data with identification data stored in the database, then returns identification information back to the mobile terminal or a computer.

The present invention provides an identification method, including the following steps of:

step 1. obtaining identification image information through photographing via a mobile terminal, and sending the identification image information to a server through a network; and step 2. receiving, by the server, the identification image information, parsing corresponding recognition data, and conducting retrieval comparison with identification data stored in a server database, then returning identification information to the mobile terminal.

The present invention provides a four-dimensional code, including an identification image and a group of recognition data corresponding to the identification image, wherein the identification image includes a true color image, a two-dimensional code, a color overlaid on the two-dimensional code, and an ID No., and the true color image, the two-dimensional code, the color overlaid on the two-dimensional code and the ID No. have same or corresponding indexes.

The present invention provides a four-dimensional code retrieval system, wherein the system includes:

an identification image and a group of recognition data corresponding to the identification image, wherein the identification image includes a true color image, a two-dimensional code, a color overlaid on the two-dimensional code, and an ID No., and the true color image, the two-dimensional code, the color overlaid on the two-dimensional code and the ID No. have same or corresponding indexes; and a server including a receiving and sending module, an identification data generation module, a database for storing identification data, and a retrieval judgment module;

wherein the identification image may be captured through a mobile terminal and sent to the server through a network, the server receives the identification image, parses corresponding identification data, and compares the corresponding identification data with identification data stored in the database, then returns identification information back to the mobile terminal or a computer.

The present invention provides a four-dimensional code retrieval method, including the following steps of:

step 1. obtaining four-dimensional code information through photographing via a mobile terminal, and sending the four-dimensional code information to a server through a network; and step 2. receiving, by the server, the four-dimensional code information, parsing corresponding identification data, and conducting retrieval comparison with identification data stored in a server database, then returning identification information to the mobile terminal.

Compared with the prior art, the present invention has the following advantages that:

the present invention utilizes an image identification technology to create a four-dimensional code concept, and provides a quick and accurate retrieval scheme through the standard setting of the four-dimensional code and a network platform; and the four-dimensional code includes big data volume and powerful encryption, identification and anti-counterfeit functions.

The present invention employs a true color image as a data carrier, has visual and compatible features, and enables users to find concerns instantaneously among numerous interference objects; when a designer designs publications like advertisement and video, the identification image is quite compatible to the publications; moreover, the users may use a device like a smartphone to photograph at once, immediately obtain data, and immediately enter a relevant platform.

BRIEF DESCRIPTION OF THE DRAWINGS

The invention will be further described hereinafter with reference to the drawings and embodiments, wherein:

FIG. 4 is a layered structure diagram of a database;

DETAILED DESCRIPTION OF THE PREFERRED EMBODIMENTS

The present invention will be further described in details hereinafter with reference to the drawings and specific embodiments.

Figure 1:
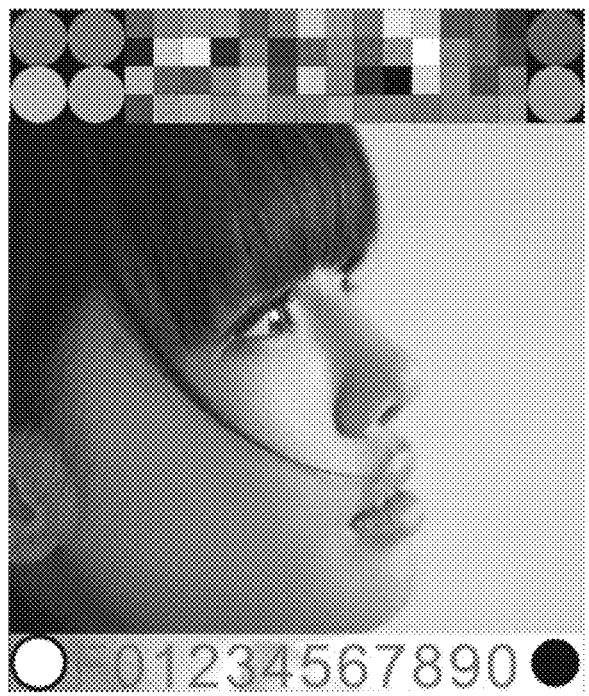
FIG. 1 is an identification image of a complete of the invention.
Figure 2:
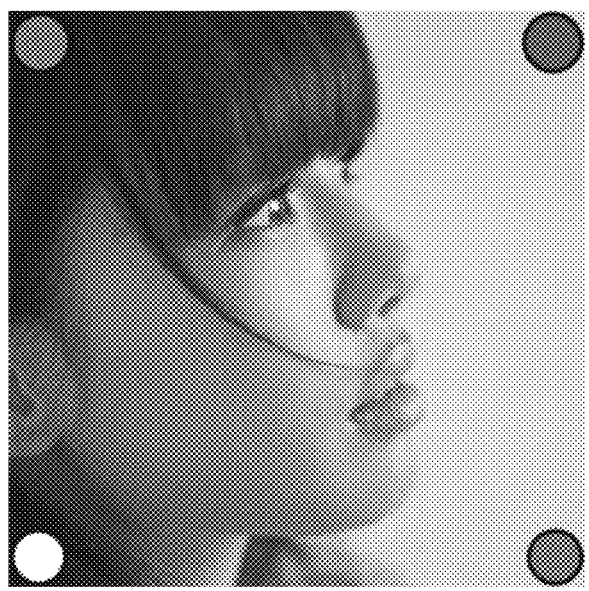
FIG. 2 is an identification image of a half format of the invention.
Figure 3:
FIG. 3 is an identification image of a pure image format of the invention.

As shown in FIG. 1 to FIG. 3, a four-dimensional code provided by the present invention includes an identification image and a group of recognition data corresponding to the identification image, wherein the identification image includes a true color image, a two-dimensional code, a color overlaid on the two-dimensional code, and an ID No., and the true color image, the two-dimensional code, the color overlaid on the two-dimensional code and the ID No. have same or corresponding indexes.

In the embodiment, the identification image includes three formats: a full format, a half format or a pure image format;

the full format includes a true color image, a two-dimensional code, a color overlaid on the two-dimensional code and an ID No., wherein the two-dimensional code is arranged above the true color image, calibration points are arranged above the identification image, and the ID No. is arranged below the true color image.

The true color image in the full format is arranged in the middle of the identification image, the calibration points are respectively arranged at the four corners of the identification image, the two-dimensional code is arranged between the calibration points at the left and right sides above the identification image, the color is overlaid on the two-dimensional code, the ID No. is arranged below the identification image, and is located between the calibration points at the left and right sides.

The ID No. may be applied to special application circumstances like no photographing conditions or reporting No. remotely through telephone. Through manually inputting the ID No., data of other dimensions can also be retrieved and complete information corresponding to the four-dimensional code can also be searched. A true color graph in the true color image may be a corporation trademark, a corporation identification image, a product identification image, a public sign identification image and the like, or be a private photograph, a private identification image and the like. Meanwhile, an identification code is obtained through operation on the image, and reciprocally retrieved with codes included in the ID No. and the two-dimensional code, or independently retrieved (i.e., the pure image format hereunder) so as to conveniently data from the database.

Color is also covered on the two-dimensional code, which displays data in a form of image, thus facilitating a terminal program of a computer or a smartphone to capture pixels from the photographed image, and restoring the pixels into data, wherein this process can be directly completed without networking. The data contents included in the two-dimensional code and the color covered thereof include: an ID No., which is the same as the ID No. at the bottom of the four-dimensional code in the format, the ID No. being a general index of the four-dimensional code; and a category No., which classifies an application category of the four-dimensional code, and assortment category, a modified version and a special category of the true color image, and the like. The application category may include enterprise application, safety application, communal facilities, social application, national standard, private application, multimedia application, education books and periodicals, other applications and the like. The category of the true color image may include a general identification image, a high resolution identification image, a face shape identification image, an automobile No. identification image, a palmprint identification image, an encryption key, an identification image, a product identification image, an education book and periodical identification image and the like. The two-dimensional code and the color covered thereof may also include such contents as enterprise business card, private business card, product content descriptions and the like.

Eight calibration points are included in the format, which are respectively arranged on the four corners, while colorful points are arranged on the upper end, a black matrix rather than a white matrix is employed so as to avoid a calibration point area being reduced by edge enhancement and brightness compensation functions of camera software in a mobile phone, a PC and a camera, while black and white points are employed as the calibration points below the four-dimensional code; moreover, black edges are carried in the white points, and the object of carrying the black edges in the white points is also to enhance the calibration point capturing ability of terminal software.

Using the calibration points has the following advantages.

1) Calibrating size: because image deformation may be caused due to photographing distance, angle, lens quality, unevenness of an object to be photographed during photographing, the correct size of the image is restored through average value operation when the image modification deformation is small, and if the image deformation is too big, then error-reporting is conducted to give up. The average value operation of the image employs five modes including neighborhood (reserving a hard edge), two linear, two cubic (applied to smooth-gradient), two cubic relatively-smooth (applied to magnification), and two cubic relatively-sharp (applied to reduction).

2) Image alignment: aligning four calibration points in a terminal program with the four calibration points at the four corners of the object photographed so as to improve the identification ability.

3) Color calibration: the RGB values of the eight calibration points are respectively as follows:

red point: RGB255, 0, 0   light red point: RGB255, 127, 127
green point: RGB0, 255, 0   light green point: RGB127, 255, 127

| | |
|---|---|
| blue point: RGB0, 0, 255 | light blue point: RGB127, 127, 255 |
| white point: RGB255, 255, 255 | black point: RGB0, 0, 0 |

The half format includes a true color image the four corners of which are respectively provided with a calibration point. The half format may be used in a special circumstance, for example, used to identify education books and periodicals. After this format is used in child reading, and after the reading is photographed using a smartphone, the smartphone will pronounce to tell the child what this is or read a story or sing a song according to this image, or a geometrical problem in a middle school textbook, and a solution or answer will be displayed in the smartphone after using the smartphone to photograph the geometrical problem. Of course, it can be used on a business card or advertisement.

The half format only uses four calibration points, which are respectively located on the four corners of the true color image. The calibration points only calibrate shapes and positions and simply calibrate colors, and a calibration method is the same as that of the full format. Adding a black box for the calibration point is to approach to a calibration point region involved by such camera processing software like edge enhancement of white circumstance pixels to cause color difference.

In the format, because no ID No. is displayed, the true color graph in the true color image needs to be firstly converted into a true color image through identification software in such a mobile terminal as a smartphone and the like, then the acquired true color image is sent to the server for comparison through network, and this situation means that: 1. the retrieval may be possibly failed; 2. networking is required; 3. a timeliness response speed is slow, and it is affected by network band width, etc., but this format is simple and visualized, and has small influences on the original graph; because the data volume of a video is big, a maximal retrieval precision is achieved. The four calibration points carried are not only configured for calibration, but also are configured to remind users that this graph is an identification image, the relevant data of which may be retrieved through photographing.

The pure image format only includes a true color image. The pure image format is mainly applied to a material object circumstance, for example, a Mcdonald flat and a light billboard cannot be applied to the above two formats, but they comply with such features like simple graph and easy identification and the like. By employing this format, people only need to photograph and obtain a true color graph, then use identification software to convert the true color graph into a pure color image, and then sends the true color image to the server to retrieve relevant data through network. This pure image format may have multiple quite good applications, and will have a significant influence on the daily life of people.

Figure 4:
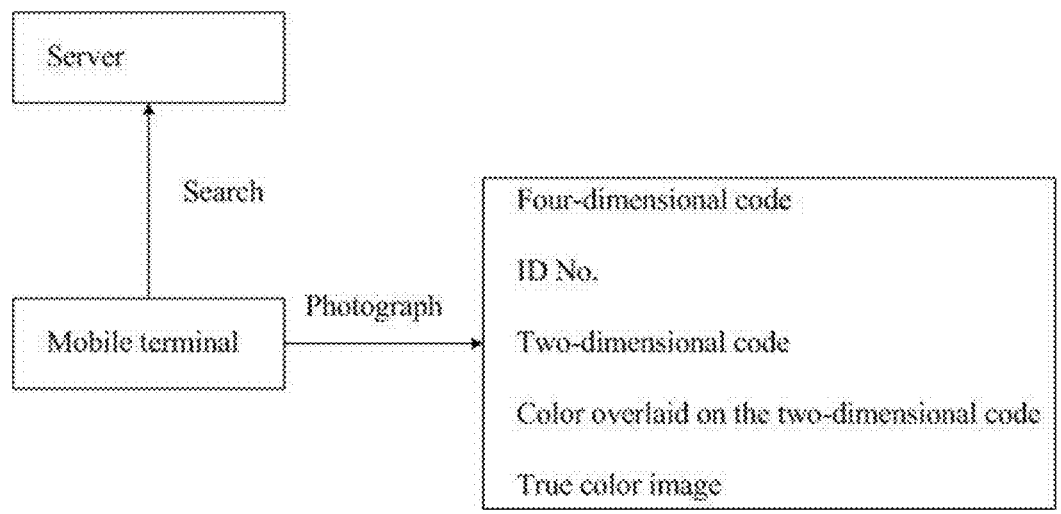
FIG. 4 is a working schematic diagram of a figure and image identification system and a retrieval system.
Figure 5:
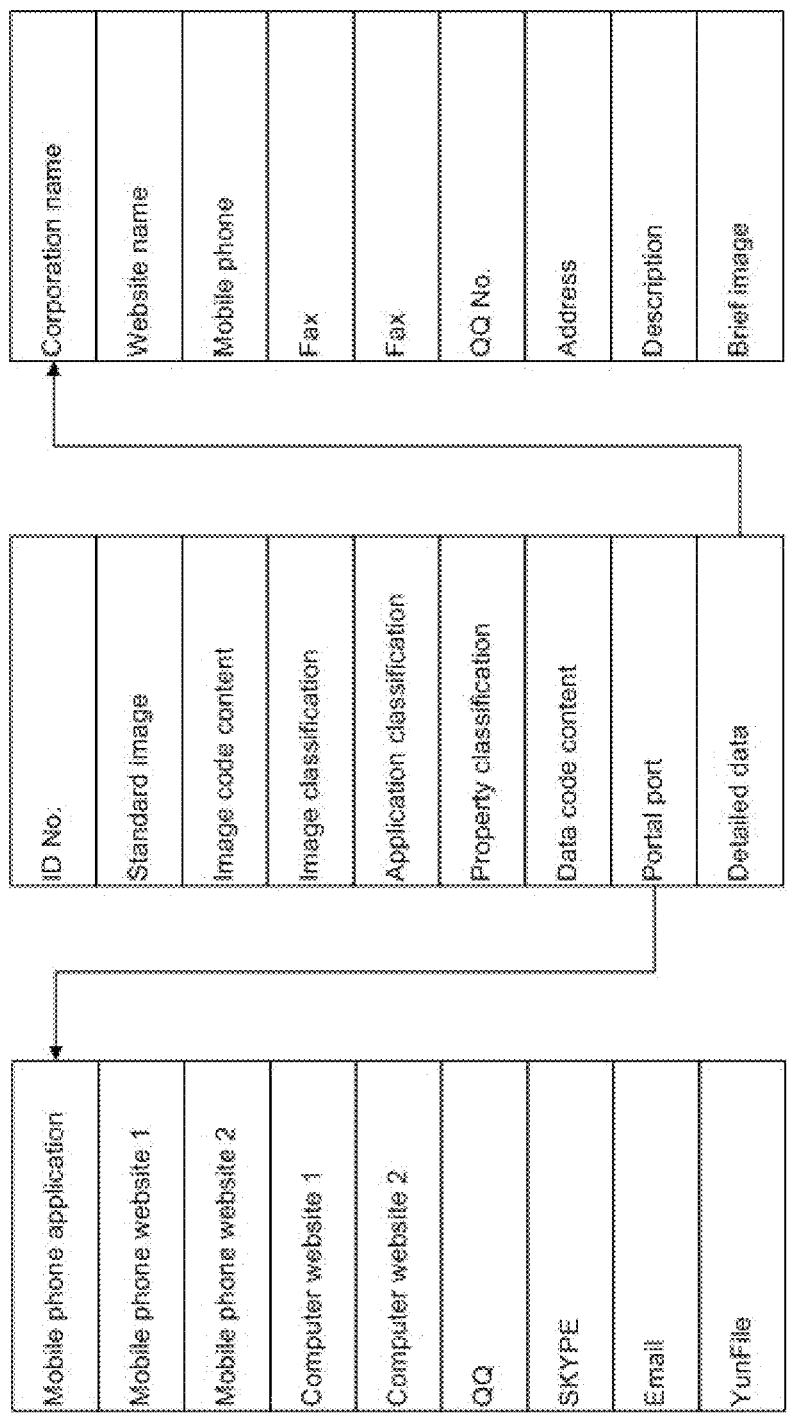
Figure 6:
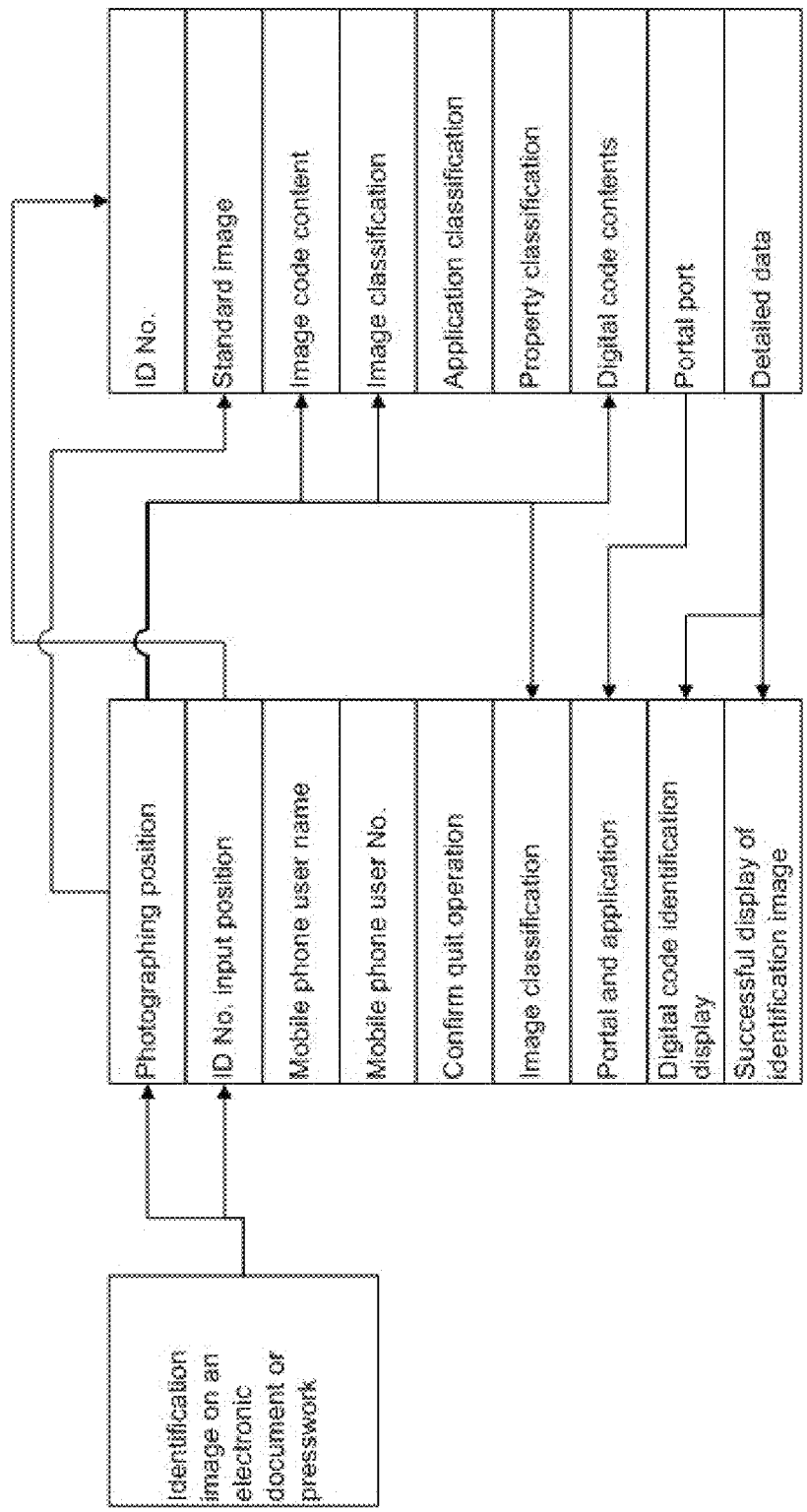
FIG. 6 is a flow chart of mobile phone call.

As shown in FIG. 4 to FIG. 6, based on four-dimensional information, an image identification system of the present invention includes an identification image and a group of recognition data corresponding to the identification image, wherein the identification image also includes three formats: a full format including a true color image, a two-dimensional code, a color overlaid on the two-dimensional code, an ID No., and a plurality of calibration points; a half format including a true color image the four corners of which are respectively provided with a calibration point; and a pure image format only including a true color image; and a server including a receiving and sending module, an identification data generation module, a database for storing identification data, and a retrieval judgment module;

wherein the identification image may be captured through a mobile terminal and sent to the server through a network, the server receives the identification image, parses corresponding recognition data, and compares the corresponding recognition data with identification data stored in the database, then returns identification information back to the mobile terminal or a computer. The identification image is scanned by a mobile terminal, i.e., the photographing function of a smartphone, a computer, a special instrument and the like is utilized to photograph an identification image printed on a certain object, then data of elements in the identification image is extracted respectively using identification software, for example, analyzing a two-dimensional code and a color overlaid on the two-dimensional code, and converting the true color graph into a true color image, thus obtaining recognition data or index, and sending the recognition data or index to a database server. A photographing object of the mobile terminal may be a business card, an advertisement, a video, a material object like a human face and a palm, a traffic flag or a cup.

The true color image includes a plane true color image, a concave-convex true color image, a physical image or a biological image. An RGB color standard is employed as a color standard of the identification image. The identification image is arranged in a black or colorful frame. The identification image further includes a plurality of calibration points arranged at the four corners thereof. The mobile terminal includes a mobile phone, an IPAD, a scanner or a laptop. The identification image is used by means of electronic document, view screen, or print publishing. The identification data includes a true color image, a LOGO, an ID No., a category No., an enterprise business card, a private business card, and product content descriptions.

The true color image is just like a corporation trademark, and may be displayed in an electronic document or a video on a computer and a mobile phone, or printed on a business card, a book or an advertisement, or be a material object like palmprint; due to outdoor application or printing demands, the identification image may be made into gray level for special category processing in software using a color identification image pair standard. in the embodiment, the color may be overlaid with the two-dimensional code. Because a user application mode is that the user inputs an electronic document through such a client as a computer, and identifies the image through an application program on a smartphone, a tablet or a desktop or a notebook; an RGB color mode is also employed as the color standard; the RGB color mode is a color standard for light source display category, which obtains various colors through changes of three colors including red (R), green (G) and blue (B) as well as mutual overlaying therebetween, wherein RGB namely represents colors of a red channel, a green channel and a blue channel; because light source overlaying is employed, the color is lighter when the total number of the RGB is larger. Each color in the RGB is divided into 256 levels, which are 0~255 respectively, and 3 three-primary colors may present 256*256*256 colors (i.e., 16777216 colors in total) on the screen, which are expressed as #FFFFFF using a hex system in programming.

The true color image of the four-dimensional code may also have various applications on business, for example, manufacturer data of a favorable product may be seen by photographing the true color image, then the product can be directly purchased by ordering a bill in the mobile phone. In case of meeting a commodity that is doubted to be a plagiarized one, the detailed data of a real manufacturer can be obtained by scanning the four-dimensional true color image of the four-dimensional code; in this way, the user an know whether the commodity purchased is a counterfeit product, so that an anti-counterfeit function is achieved. The true color image may also be used for encryption, for example, conducting autodyne on the palmprint of one's own and comparing with a standard image stored in a network database, thus serving as a mode of unlocking a mobile phone, or an encryption mode of bank card payment for online and offline shopping; in this way, decryption is impossible during man-mobile phone separation or man-card separation, so as to improve the trading security. The method may also be used to human face identification, card license identification, communal traffic facility identification, etc. Dynamic encryption of the true color image of the four-dimensional code may also be realized through mobile phone photographing; a dynamic data chain displayed on a banking terminal machine is photographed in real time using a smartphone, and is transmitted back to a bank through a mobile phone network; meanwhile, the banking terminal machine obtains a telephone number, a data chain and possibly palmprint identification and fingerprint identification (provided by the banking terminal machine), and agrees to trade.

Both the true color image of the four-dimensional code also has certain limitation, and a problem of difficult image contrast occurs easily for cases like complicated image, too much noises and burrs, and too dark or bright environment lights. Moreover, because the photographing is mainly conducted through a smartphone, a tablet and the like, difficult identification may also be caused by insufficient resolution of lens and excessive joggling. However, these problems may also be solved by thinning various photographing situations and raising corresponding schemes, for example, palmprint photographing for encryption, requiring to select to confirm whether a left hand or a right hand is photographed in a mobile program, and requiring to vertically place a longest palmprint and the calibration points in the mobile phone program to be aligned with the upper end face and aligned with the longest palmprint. Likewise, photographing on a human face, a product, a public sign, a corporation trademark and the like may have corresponding requirements, thus being capable of better solving the image contrast and identification problems.

Based on four-dimensional information, the present invention further provides a four-dimensional code retrieval system, including: an identification image and a group of recognition data corresponding to the identification image, wherein the identification image includes a true color image, a two-dimensional code, a color overlaid on the two-dimensional code, and an ID No., and the true color image, the two-dimensional code, the color overlaid on the two-dimensional code and the ID No. have same or corresponding indexes; and a server including a receiving and sending module, an identification data generation module, a database for storing identification data, and a retrieval judgment module; wherein the identification image may be captured through a mobile terminal and sent to the server through a network, the server receives the identification image, parses corresponding recognition data, and compares the corresponding recognition data with identification data stored in the database, then returns identification information back to the mobile terminal or a computer.

A mobile terminal in the four-dimensional code retrieval system includes a mobile terminal, an IPAD, a scanner or a laptop.

Figure 7:
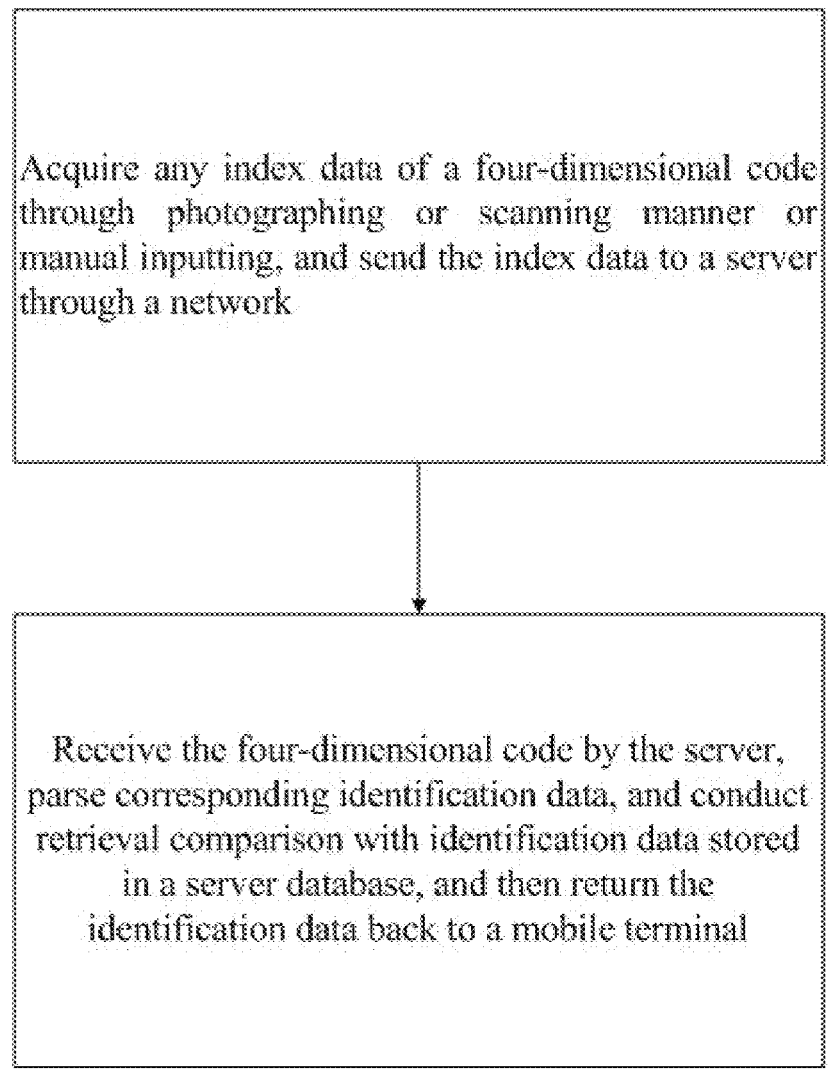
FIG. 7 is a flow chart of a four-dimensional code retrieval method.

As shown in FIG. 7, based on four-dimensional information, the present invention also provides a four-dimensional code retrieval method, including the following steps of:

step 1. obtaining four-dimensional code information through photographing via a mobile terminal, and sending the four-dimensional code information to a server through a network; and step 2. receiving, by the server, the four-dimensional code information, parsing corresponding recognition data, and conducting retrieval comparison with identification data stored in a server database, then returning identification information to the mobile terminal.

An ID No. is used as a connection port between a smartphone and a database; in case of a full format, if photographing cannot be conducted due to such situations like without the mobile phone does not have a photographing function, is wrong to photograph, under a dim light, and a computer has no camera, and remotely reports the ID No. only. At this moment, the user can also enter a system or a network database by manually inputting the ID No. under a smartphone interface or a computer interface. In case of other situations in the full format, true color image, two-dimensional code and/or three-dimensional color code may be calculated through photographing; the two-dimensional code and/or three-dimensional color code may directly present normal information contents on the mobile phone directly without through a network; meanwhile, the true color image and the two-dimensional code and/or three-dimensional color code and the ID No. together retrieve the network database.

When employing the half format and the pure image format, only a true color image can be produced and retrieved in the database, which is easy to cause the image to be not identified due to distortion, and finally causes retrieval failure; therefore, fault-tolerance processing is needed in a plurality of processes. In the present invention, fault-tolerance processing on two parts is conducted, wherein one is to calculate using a matrix character of a graphics dot-matrix, which will be introduced in details hereinafter, and the other is to conduct similarity operation on the data in the network database, and push highly-similar graphs to the mobile phone interface for the user to re-confirm. Moreover, the user is confirmed using the user name of the mobile phone and the user No. of the mobile phone, and a using object of the user is confirmed, and the user needs to input passwords or the palmprint needs to be identified for security classification application, for example, network payment.

Because the information of the full format is most complete, and the ID information has an interactive retrieval relation at three levels, the full format is preferentially used, for example, a business card, a bank card, an advertisement, a video and the like. A half format may be used in a special circumstance; because the half format has four calibration points, the user after seeing will understand that this is a format of a four-dimensional code; a true color image data is calculated out via a system by photographing via the mobile phone (conversion from graph to number), then a corresponding ID No. is retrieved through a computer, so that the user enters a special portal. This manner may be applied to audible readings for children, and the like. For example, the user applies a pure image format, and manufactures the pure image format on the business card; the user can acquire user data and enter a user platform by using the smartphone to photograph the true color image data on the business card.

During the process of photographing or scanning the four-dimensional code or a data frame carrying the four-dimensional information, influences of photographing and scanning devices and circumstances need to be eliminated; moreover, moving the devices also has a very big influence on the four-dimensional code or the data frame carrying the four-dimensional information, which affects the distortion of size, darkness, chromaticity and exposure. The circumstances include the brightness and color of circumstance light, which will have significant influences on the four-dimensional code or the data frame carrying the four-dimensional information.

Pigments of partial colors of the four-dimensional code or the data frame carrying the four-dimensional information in publications will be faded severely, wherein a grey level identification image may be employed in this circumstance.

Damaged or excessively distorted four-dimensional code or data frame carrying the four-dimensional information has lost partial functions, which can be given up only or an ID No. in the full format is entered in the mobile phone for retrieval.

Software denoising treatment is launched after photographing or scanning, wherein a treatment method is as follows.

Neighborhood averaging method: taking blurreding as a cost to change reduction of noises.

Median filtering: employing a middle-value calculating or weighting operation manner in the field of mathematics, which also takes blurreding as a cost to change reduction of noises.

Eliminating isolated noise: removing independent or regular spots.

Sharpening: i.e., Edge enhancement processing, which allows the image to become more clear, and includes such manners as differentiation sharpening, edge detection and the like.

Color processing: processing of automatic color tone, automatic contrast and automatic color (the data of a web server is also pre-processed for ensuring the consistency).

The mobile terminal or server will also conduct image thinning, wherein a process of thinning image is just a process of calculating an image skeleton, which is mainly applied to face shape identification, handprint identification, corporation LOGO identification and product identification in the pure image format.

The mobile terminal or the server may also conduct contour extraction using a method of hollowing out internal points, wherein the functions are similar to that of the thinning part.

The mobile terminal or server will also conduct textural feature extraction, which is divided into a structural analysis method and a statistical analysis method. Structural analysis method: using a formalization language to extract a texture primitive and reason the arrangement rules of the texture primitive, which is mainly configured to the identification of the pure image format. Statistical analysis method: this is a method mainly used for identification image, which confirms an origin point and an end point of a graphic matrix, establishing a graph digitization matrix and comparing the graph digitization matrix with a standard graph digitization matrix, confirming similarity and entering assessment. The statistical analysis method is mainly used for identifying full format and half format.

The mobile terminal or the server will conduct image identification processing on the four-dimensional code or the data frame carrying the four-dimensional information, wherein a program for image identification processing is explained hereinafter:

establishing of full format and half format mathematical model: a manner of a graphics dot-matrix corresponding to a digital matrix is employed, wherein each graphics dot-matrix is corresponding to three base color matrixes including a red digital matrix, a green digital matrix and a blue digital matrix. One-dimensional data code; two-dimensional code; and three-dimensional color code and true color image;

characters of the three basic color matrixes are extracted and used as a true color image for retrieval, to form several related and interactive retrieval manners including true color image retrieval, ID No. retrieval and two-dimensional code and/or color overlaid on the two-dimensional code.

The three digital matrixes are rich of textures, while on the aspect of texture extraction, a two-dimensional Gabor filter has relatively apparent advantages; therefore, the two-dimensional Gabor filter is employed in the patent to extract textures.

A two-dimensional Gabor function is composed of a product of a gauss function and a complex plane wave, and a two-dimensional expression thereof is as follows:

expression of complex number:

$$g(x, y; \lambda, \theta, \psi, \sigma, \gamma) = \exp\left(-\frac{x'^2 + \gamma^2 y'^2}{2\sigma^2}\right)\exp\left(i\left(2\pi\frac{x'}{\lambda} + \psi\right)\right)$$

Real number part:

$$g(x, y; \lambda, \theta, \psi, \sigma, \gamma) = \exp\left(-\frac{x'^2 + \gamma^2 y'^2}{2\sigma^2}\right)\cos\left(2\pi\frac{x'}{\lambda} + \psi\right)$$

Imaginary part:

$$g(x, y; \lambda, \theta, \psi, \sigma, \gamma) = \exp\left(-\frac{x'^2 + \gamma^2 y'^2}{2\sigma^2}\right)\sin\left(2\pi\frac{x'}{\lambda} + \psi\right)$$

Wherein, x'=x cos θ+y sin θ and y'=−x sin θ+y cos θ are represented by complex number:

$$g(x, y; \lambda, \theta, \psi, \sigma, \gamma) = \exp\left(-\frac{x'^2 + \gamma^2 y'^2}{2\sigma^2}\right)\exp\left(i\left(2\pi\frac{x'}{\lambda} + \psi\right)\right)$$

Real number part:

$$g(x, y; \lambda, \theta, \psi, \sigma, \gamma) = \exp\left(-\frac{x'^2 + \gamma^2 y'^2}{2\sigma^2}\right)\cos\left(2\pi\frac{x'}{\lambda} + \psi\right)$$

Imaginary part:

$$g(x, y; \lambda, \theta, \psi, \sigma, \gamma) = \exp\left(-\frac{x'^2 + \gamma^2 y'^2}{2\sigma^2}\right)\sin\left(2\pi\frac{x'}{\lambda} + \psi\right)$$

Wherein, x'=x cos θ+y sin θ and y'=−x sin θ+y cos θ

The feature dimension of a sample processed by the two-dimensional Gabor filter will be higher, and needs to be compressed to a sample data feature so as to improve the computing speed of a smartphone, a computer and the like; therefore, the feature dimension of the image sample is reduced, wherein a two-dimensional discrete cosine transform mode is employed herein for reducing the dimension: the discrete cosine transform, and particularly the second type (photograph) thereof is frequently used for signal processing and image processing, for conducting lossy data compression on signals and images (including still images and moving images). This is because that the discrete cosine transform has very strong "energy concentration" property: the majority energy of natural signals (including sounds and images) is concentrated in a low frequency part after the discrete cosine transform; moreover, when the signal has a statistics property approaching to markov process, the decorrelation of the discrete cosine transform is approaching to the performance of K-L transform (Karhunen-Loève transform—having optimum decorrelation).

For example, the discrete cosine transform is used in both a still picture encoding standard JPEG, and moving picture encoding standards MJPEG and MPEG. The second type of two-dimensional discrete cosine transform is used in all the standard systems, and entropy coding is conducted after a result is quantified. At this moment, 8 is usually corresponding to the n in the second type of discrete cosine transform, and this formula is used to conduct transform on each line of every 8×8 blocks and then conduct transform of each row. An 8×8 transform coefficient matrix is obtained. Wherein an element of (0,0) position is just a direct current component, and other elements in the matrix represent alternating current components of different frequencies according to positions.

The definition of the two-dimensional discrete cosine transform is as follows:

$$F(0, 0) = \frac{1}{\sqrt{N}} \sum_{X=0}^{N-1} \sum_{y=0}^{N-1} F(x, y)$$

$$F(0, v) = \frac{\sqrt{2}}{N} \sum_{X=0}^{N-1} \sum_{y=0}^{N-1} F(x, y) \cdot \cos\frac{(2x+1)v\pi}{2N}$$

$$F(u, 0) = \frac{\sqrt{2}}{N} \sum_{X=0}^{N-1} \sum_{y=0}^{N-1} F(x, y) \cdot \cos\frac{(2x+1)u\pi}{2N}$$

$$F(u, v) = \frac{\sqrt{2}}{N} \sum_{X=0}^{N-1} \sum_{y=0}^{N-1} F(x, y) \cdot \cos\frac{(2x+1)u\pi}{2N} \cdot \cos\frac{(2x+1)v\pi}{2N}$$

Figure 8:
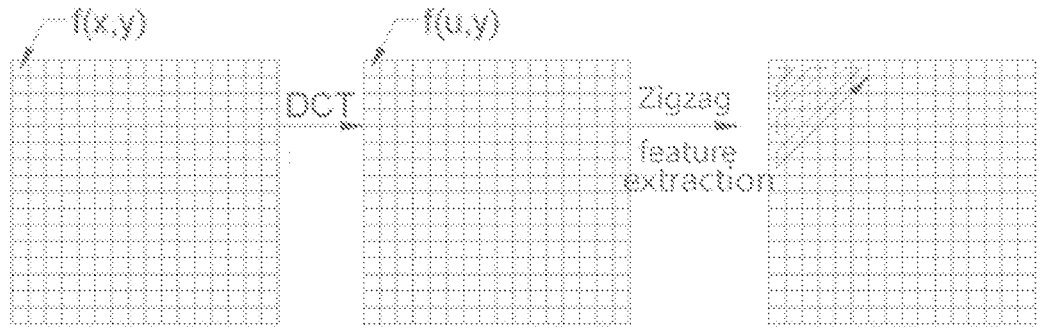
FIG. 8 is an image of specific operation processes for a zigzag scanning method of processing graph matrices.
Figure 8:
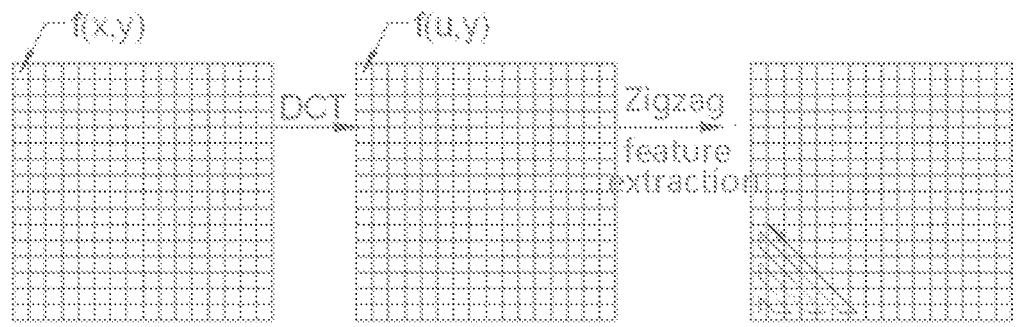
Figure 8:
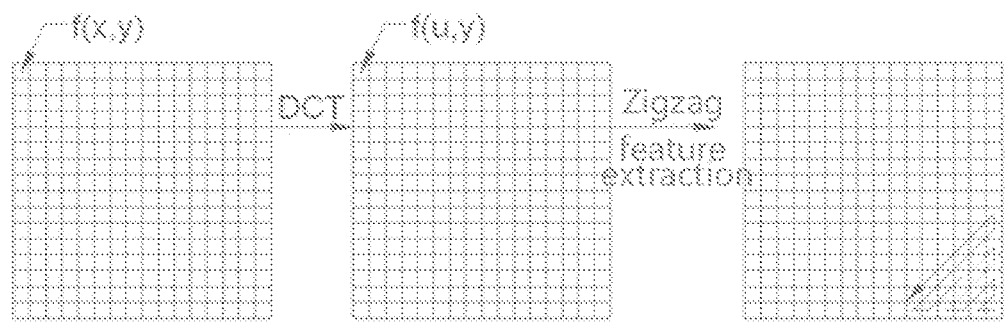

A zigzag scanning method is employed as a manner of processing graph matrix via discrete cosine transform, which can effectively extract larger coefficient information of the image, and a specific operation process is as shown in FIG. 8.

Establishing of pure image format mathematical model:

Notes: when the full format and half format while being made on an electronic document or a presswork will be controlled intentionally since calibration points are provided and it is intended to let the user to photograph. Therefore, the readability of the full format and the half format is strong, while the images of the pure image format do not have boundaries or calibration points, and thus have poor readability. In order to improve the readability, some conventions and algorithms are increased on the basis of full format and half format algorithms. These conventions will be calculated on application programs of such terminal tools as a smartphone or a tablet, and shown on a program interface through classification and explanation; meanwhile, through identifying and calculating, a group of images are pushed out on the application program of the terminal in an ordering manner of similarity to the user for confirmation. Some applications are used for explanation hereinafter:

general identification requirement of the pure image format:

requirement on directivity: placing angles of graph products are required to be consistent with the identification image; if necessary, identification images of other viewing angles are applied according to the use features of the user, and are associated with each other.

Requirements on photographing area: the frame size of the photographing area is the same as that of a frame in an application program of a mobile phone; it is designed to set a photographing object to have big contrast with the background on the aspects of color, field depth and brightness, and a frame for finding a view and the features of the identification image are prompted possibly so as to attract the user to photograph.

The identification image of the pure image format may be different from that of the full format and the half format, as long as the system points towards one category; therefore, the identification image can be specially designed with an imaginative power; and even a transition type identification image between the pure image format and the half format can be designed as long as it prompts the user to photograph the image.

Road sign identification: the road sign is typically an identification image of the pure image format property, which is extremely easy to identify due to simple and smooth lines and no excessive-color transition zones (gradient color), and can be identified as long as the general identification requirements of the pure image format are satisfied.

Face shape identification: the human face identification is an identification mode of the pure image format; therefore, the general identification requirements of the pure image format need to be satisfied as well; meanwhile, the human face has special common characters thereof, which are the features need to be sought by the human face identification: the common characters of the human face are that all the human faces have hair, eyes, eyebrows, noses and lips; due to individual differences, sizes and positions are different from each other; and in particular, the resolution of the camera of the smartphone at present is as high as 10 million pixels, the difference is larger.

At present, the human face identification has been relatively mature. For the highly effective calculation of a mobile phone terminal, the present invention employs a digital matrix corresponding to a pixel matrix same as that of the full format, and the calculation methods are the same, while the frames and the positioning points of the images need to be processed uniquely: the frames of the image include a jaw and two ears, and two eyes are taken as the setpoints, so as to calculate the angle and positioning of the image (the frames of the image and the setpoints will appear on the mobile phone terminal). Other situations are solved via a manner of grouping of looking up and looking down associated with the identification image. This manner can be better than the current face identification technology. The reasons thereof are that: other software judges through calculating the height ratio and width ratio of left and right eyes as well as the height ratio and width ratio of mouths, and some software judges through calculating eyebrow and ear shapes; butt the most discriminative features like whether there are nevus, spot and scar on the face are given up. While the present invention employs a data matrix of the graphics dot-matrix to calculate and obtains a maximal accuracy rate using fault tolerance on the operation aspect as well as a manner of visual selection and judgment on a user interface.

Palm-shape identification of palm-shape: the smartphone is applied very universally at present, and multiple people like autodyne, and it is very convenient to perform autodyne on the self-owned palmprint through a mobile phone, which is unlike to fingerprints that can only be identified using a special instrument, while the palmprint may play a role of encryption in the identification image system particularly for QQ No., payment password and unauthorized consumption when the user and the mobile phone are separated. The palmprint identification can be extended to palm-shape identification, finger-shape identification and the like.

Algorithms increased in palmprint identification: to increase the feasibility of the encryption application, a digital contour feature algorithm and a digital skeleton feature algorithm are increased on the basis of a matrix feature extraction manner. The palm-shape identification operation manner is the same as that of the face shape identification. The frame and setpoint of the image of the palm-shape identification are as shown in the right figure (the frame and the setpoint of the frame will appear on the mobile phone terminal), and photographing can be conducted after left and right hands are confirmed.

Corporation logo identification: the corporation logo identification is the same as that of the road sign.

Product identification: the product identification is similar to the human face identification, which requires to photograph the most representative features and apparent features, and problems can be solved using a manner of a plurality of identification images to compose an associated identification image. For the products expected to be popularized by the corporation on an advertisement, the full format or the half format needs to be possibly used. Especially, the full format can be retrieved by 100% via networking, and includes related data of the corporation.

A four-dimensional code is an organic combination of data and image, wherein the image is called via the data, and also the data is called via the image; and the data is transformed into the image, and the feature data is detected through the image as well. The four-dimensional code only defines one interface standard, through which a common platform with big data features is formed to constitute mutual retrieval and identification of data and image which are applied in all walks of life.

Due to the smartphone and the camera of the mobile phone that can photograph in anytime, the identification image emerges. Therefore, there will certainly be a mobile phone portal established on the basis of the identification image, which is surely to enable incomputable applications by means of the quick retrieval and blurred identification functions of the identification image, for example, enterprise identification (equivalent to a second trademark of the enterprise), private identification (equivalent to private PAGE OR ID), product or works recognition (for example, product appearance identification or a credit card with private head portrait).

Protective effect on product design patents: design patent products are accepted preferentially, the same design product after being identified via photographing is preferentially to enter an enterprise portal, and counterfeit commodity reminding may be provided for those violate the requirements of the patent law due to different details.

To solve the network payment security problem of the mobile phone or the computer, for example, palmprint identification, can ensure that the money cannot be withdrawn by somebody else even if the mobile phone is lost.

The four-dimensional code may be served as a second trademark of a corporation: a corporation trademark needs to be approved by the State Trademark Office, which is complicated in flow and is difficult to pass, and can be black and white draft only. While the four-dimensional code is governed by a privately owned enterprise and performed under the premise of not violating the Trademark Law, and can point to a portal directly through a computer and mobile phone APP via digital ID distinction. The four-dimensional code has the advantages of true color, complicated pattern, pointing to the portal, easy remembering, free inputting and being associated with a product code. The four-dimensional code is developed and controlled by the privately owned corporation, formulated with a system standard and provides services to the society, which can be understood as: a registration trademark is a name applied to the country by an ownership corporation, while the four-dimensional code is a No. applied by other corporation towards a four-dimensional code corporation. The trademark seems severe with no mistake allowed, while the four-dimensional code is flexible and vivid, and is close to people. The feature of the trademark is for distinction only, while the four-dimensional code is for quick identification so as to enter conveniently.

The four-dimensional code has rich colors, which may make designers feel; therefore, more classical four-dimensional codes can be designed, and the four-dimensional code is more suitable for modern society, and is more suitable for present network, computer and mobile phone, and is more suitably applied on a business card, a bus card and a bank card. Moreover, the four-dimensional code can both be photographed on television and billboard, for example: you can photograph the sign of McDonald 100 m away using a mobile phone, and enter the portal of the fast-food restaurant with GPS, and know that the hamburgers thereof are sold out, so that you do not need to go.

Application of human face: A) application to a star (also applicable to all the people): establish an identification image of the star through a standard form, then you can enter the portal of the star by photographing on street or movie or television; maybe he is waiting for interaction with you. B) Application to a wanted man: a public security department establishes an identification image, and then ditto, then everyone can catch criminals.

Product identification image: an empty bottle may have no package possibly, and even a word or a sign cannot be seen; as long as a product identification image is established, you can know the bottle by photographing. The product identification image is just an identification image generated by photographing a material object. Moreover, the product is not subjected to sizes, and can be as small as a grain of rice, which can be identified as long as it has no distinction to other rice.

Protective effect on product design patents: design patent products are accepted preferentially, the same design product after being identified via photographing is preferentially to enter an enterprise portal, and counterfeit commodity reminding may be provided for those violate the requirements of the patent law due to different details. The identification image is also a helpful too for cracking down on counterfeit goods.

Multimedia application: after an identification image is produced for such products as teleplay, movie, music, book, software and games, a viewer will know what somebody is doing through seeing the identification image. As long as you are interested, audition can be tried by photographing after seeing at any place on any medium, and purchasing on spot can be implemented after satisfaction.

Application on logistics aspect: as long as establishing a logistics identification image, what is in a package can be known by having a look at the entire storage and logistics, and logistics control can be entered as long as scanning, and preappoint on sending-receiving is not needed as it is uniform big data. The entire logistics is more uniform and quick, and is also better interactive with the user.

Establishing of national identification image identification system: after an identification image identification image is established for communal facilities and signs, the public may acquire sign information by photographing the road signs with a mobile phone, and can enter a bus portal by photographing a bus No. and a road No., thus knowing the time of next bus and whether more people are in the bus. After the intelligence of small vehicles, automatic photographing of the signs and automatic reminding are implemented.

Influence on education aspect: for example, corresponding pronunciation and interpretation will be obtained by photographing a book formed by the identification image via a mobile phone during infant education, and corresponding hints and answers may be obtained by photographing geometric figures and chemical equations. These figures cannot be solved in the past, and corresponding application can be conducted to others such as theme parks and temples.

Application on encryption aspect: the identification image itself is namely image identification; therefore, the identification image itself is just an encipher, for example, an identification image can be manufactured for palmprint, finger-shape and handle-shape, which together with digital numbering and APP encryption, forms a quick multi-layer password so as to form a sufficient confidentiality level to improve the encryption ability, for example: one identification image is added on a bank card; even if a bank card code and the bank card are separated, it cannot be seen unless using a user mobile phone to photograph, while this identification image itself is another layer of encryption key for the bank card. For example, while paying via Alipay, the palmprint of the owner needs to be photographed by the mobile phone of the owner; in this way, it does not need to worry about the problem of fund stolen due to losing of the mobile phone.

Share of file, software, video and language: the cloud storage property of the identification image is utilized to finish intertransmission and share of files, software, videos and voices between the mobile phone and the computer, a corresponding identification image is generated by registering on an identification image website, and can be transmitted to the mobile phone by using the mobile phone to photograph. Or, an identification image network group is established in a later period, which may produce a function same as QQ, and the interaction between the mobile phone and the computer is stronger; chatting, sending and receiving files, software, videos and voices through one picture only, including entering the portal.

Identification of intersection between a mobile phone and an access control system: a code value of the identification image is inputted in the access control system; in this way, the identification image displayed by the mobile phone can be accepted, and interactive identification can be implemented if the two parties both have a camera and a screen.

Wireless code matching between electronic products, for example, code inputting of bluetooth and WIFI is solved. For example, code can be matched by beating a bluetooth speaker box, and the identification image can be similarly utilized to connect the mobile phone to a computer.

Parts of these are also implemented on a two-dimensional code, while the identification image is further improved. The identification image is not only beautiful and includes data, but also will be a graphical standard for quick retrieving. The identification image supported by big data can quickly retrieve and quickly open a website and a portal.

The generation of the four-dimensional code is completed through the above technical solution, and interactive retrieval may be conducted using a mobile phone, a tablet, a personal computer and the like, according to the information of each dimension of the four-dimensional code.

The above embodiments are only used to explain the detailed description of the invention. It should be noted that those having ordinary skills in the art of the invention may also make many modifications and improvements without departing from the conceive of the invention which shall all fall within the protection scope of the invention.

What is claimed is:

1. An image identification system, comprising:
an identification image in a full format comprising a true color image, a two-dimensional code image covered by color, an ID No. and a plurality of calibration points, wherein all of the true color image, the two-dimensional code image covered by color and the ID No. are displayed in the identification image in the full format;
a mobile terminal device, configured to capture the identification image;
a server storing identification data, connected with the mobile terminal device through a network, and configured to
receive the identification image from the mobile terminal device through the network;
obtain recognition data corresponding to the identification image from the identification image;
compare the recognition data with the identification data to generate identification information corresponding to the identification image; and
send the identification information to the mobile terminal device through the network,
wherein the true color image, the two-dimensional code image covered by color and the ID No. have same or corresponding indexes, and each of the indexes corresponds to the identification information corresponding to the identification image.

2. The image identification system according to claim 1, wherein the identification image in the full format further comprises eight colorful calibration points, wherein:
the two-dimensional code image is located above the true color image,
the ID No. is located below the true color image,
four of the eight colorful calibration points are located on the top left of the true color image,
two of the eight colorful calibration points are located on the top right of the true color image,
one of the eight colorful calibration point is located on the lower left of the true color image, and
one of the eight colorful calibration point is located on the lower right of the true color image.

3. The image identification system according to claim 1, wherein a color standard of the identification image is RGB color standard.

4. The image identification system according to claim 1, wherein the true color image is at least one of a plane true color image, a concave-convex true color image, a physical image or a biological image.

5. The image identification system according to claim 1, wherein the identification data is at least one of the true color image, a LOGO, the ID No., a category No., an enterprise business card, a private business card, and product content descriptions.

6. The image identification system according to claim 1, wherein the identification image is arranged in a black or colorful frame.

7. The image identification system according to claim 1, wherein the identification image is displayed in a format of an electronic document or a video, or printed on a publishing document.

8. The image identification system according to claim 1, wherein the mobile terminal device is one of a mobile phone, an IPAD, a scanner and a laptop.

9. The image identification system according to claim 1, wherein the server is further configured to obtain the recognition data by generating and overlaying data comprising true color image data, two-dimensional code image data, color data and ID No.

10. The image identification system according to claim 9, wherein the server is further configured to process the true color image data to generate the recognition data via at least one of geometric transformation, denoising, thinning, contour extraction and textural feature extraction.

11. An image identification method, comprising:
step 1: obtaining identification image information of an identification image in a full format comprising a true color image, a two-dimensional code image covered with color, and an ID No. through photographing via a mobile terminal device, and sending the identification image information to a server through a network, wherein all of the true color image, the two-dimensional code image covered by color and the ID No. are displayed in the identification image in the full format; and
step 2: receiving, by the server, the identification image information, obtaining recognition data corresponding to the identification image based on the identification image information, and conducting retrieval comparison between the recognition data and identification data corresponding to the identification image information and stored in the server to generate identification information, then sending the identification information to the mobile terminal device,
wherein the true color image, the two-dimensional code image covered with color, and the ID No. have same or corresponding indexes, and each of the indexes corresponds to the identification information corresponding to the identification image.

12. A four-dimensional code retrieval method, comprising the following steps of:
step 1: obtaining four-dimensional code information of an identification image in a full format comprising a true color image, a two-dimensional code image covered by color and an ID No. through photographing via a mobile terminal device, and sending the four-dimensional code information to a server through a network, wherein all of the true color image, the two-dimensional code image covered by color and the ID No. are displayed in the identification image in the full format; and
step 2: receiving, by the server, the four-dimensional code information, obtaining recognition data corresponding to the identification image based on the four-dimensional code information, and conducting retrieval comparison with identification data stored in a server database, then returning identification information corresponding to the identification image to the mobile terminal device,
wherein the true color image, the two-dimensional code image covered by color and the ID No. have same or corresponding indexes, and each of the indexes corresponds to the identification information.

\* \* \* \* \*